United States Patent
Mandal et al.

(10) Patent No.: US 7,350,568 B2
(45) Date of Patent: Apr. 1, 2008

(54) LOGGING A WELL

(75) Inventors: Batakrishna Mandal, Missouri City, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 274 days.

(21) Appl. No.: 11/054,217

(22) Filed: Feb. 9, 2005

(65) Prior Publication Data

US 2006/0175057 A1 Aug. 10, 2006

(51) Int. Cl.
*E21B 47/12* (2006.01)

(52) U.S. Cl. .................. 166/254.2; 175/41; 175/50

(58) Field of Classification Search ............ None
See application file for complete search history.

(56) References Cited

U.S. PATENT DOCUMENTS

| | | | |
|---|---|---|---|
| 2,354,887 A | 8/1944 | Silverman et al. | 177/352 |
| 3,186,222 A | 6/1965 | Martin | 73/151 |
| 3,187,252 A | 6/1965 | Hungerford | 324/6 |
| 3,305,771 A | 2/1967 | Arps | 324/6 |
| 3,408,561 A | 10/1968 | Redwine et al. | 324/6 |
| 3,967,201 A | 6/1976 | Rorden | 325/8 |
| 4,360,777 A | 11/1982 | Segesman | 324/339 |
| 4,553,097 A | 11/1985 | Clark | 324/338 |
| 4,567,759 A | 2/1986 | Ekstrom et al. | 73/152 |
| 4,578,675 A | 3/1986 | MacLeod | 340/855 |
| 4,692,908 A | 9/1987 | Ekstrom et al. | 367/27 |
| 4,725,837 A | 2/1988 | Rubin | 340/855 |
| 4,739,325 A | 4/1988 | MacLeod | 340/854 |
| 4,747,303 A | 5/1988 | Fontenot | 73/152 |
| 4,786,874 A | 11/1988 | Grosso et al. | 324/369 |
| 4,839,644 A | 6/1989 | Safinya et al. | 340/854 |
| 4,979,151 A | 12/1990 | Ekstrom et al. | 367/35 |
| 5,017,778 A | 5/1991 | Wraight | 250/254 |
| 5,045,795 A | 9/1991 | Gianzero et al. | 324/342 |
| 5,200,705 A | 4/1993 | Clark et al. | 324/338 |
| 5,235,285 A | 8/1993 | Clark et al. | 324/342 |
| 5,339,036 A | 8/1994 | Clark et al. | 324/338 |
| 5,563,512 A * | 10/1996 | Mumby | 324/339 |
| 5,720,355 A | 2/1998 | Lamine et al. | 175/27 |
| 5,798,488 A | 8/1998 | Beresford et al. | 181/102 |
| 6,359,438 B1 * | 3/2002 | Bittar | 324/369 |
| 6,581,699 B1 | 6/2003 | Chen et al. | 175/61 |

FOREIGN PATENT DOCUMENTS

CA 685727 5/1964 ............ 324/373

OTHER PUBLICATIONS

T. I. Wang, "Feasibility Study of POSLOG Project," IKU Sintef Group Publication 8., Jul. 28, 1989.

(Continued)

*Primary Examiner*—Zakiya W. Bates
(74) *Attorney, Agent, or Firm*—Baker Botts, L.L.P.

(57) ABSTRACT

A method for logging a well. Includes receiving energy with at least one array of elements coupled to a drill bit, wherein the at least one array of elements functions as an electronic array. An apparatus for logging a well includes a drill bit and at least one array of elements coupled to the drill bit, wherein the at least one array of elements functions as an electronic array.

49 Claims, 9 Drawing Sheets

OTHER PUBLICATIONS

A.H. Thompson & G.A. Gist, "Geophysical Applications of Electrokinetic Conversion," *The Leading Edge* 1169-73, Dec. 1993.

M. Rider, *The Geological Interpretation of Well Logs*, 1-18, 91-114, 199-225., 1996.

T. Haynes, "A Primer on Digital Beamforming," *Spectrum Signal Processing* 1-15., Mar. 26, 1998.

C.A. Maranuk, et al., "A Concept of a New Steerable Drilling System for Coiled Tubing," SPE 60752, at 1-10., Apr. 2000.

S. Gianzero, et al., "A New Resistivity Tool for Measurement-While-Drilling," SPWLA Twenty-Sixth Annual Logging Symposium, 1-22., Jun. 17-20, 1985.

T. I. F. Grupping, et al., "Performance Update of a Dual-Resistivity MWD Tool with Some Promising Results in Oil-Based Mud Applications," SPE 18115, Houston, Tex., 73-85, Oct. 2-5, 1988.

T. I. F. Grupping, et al., "Recent Performance of the Dual-Resistivity MWD Tool," SPE Formation Evaluation, 171-176, Jun. 1990.

S. Gianzero, et al., "Determining the Invasion Near the Bit with the MWD Toroid Sonde," SPWLA Twenty-Seventh Annual Logging Symposium, 1-17, Jun. 9-13, 1986.

"Dipmeter Interpretation," vol. I-Fundamentals, Schlumberger Ltd. Publication, 1-60, 1981.

"Diplog-Analysis and Practical Geology," Dresser Atlas Publication, 1-57 [Referenced in U.S. Patent No. 5,200,705—a copy could not be located], 1983.

Seth Haines, et al., "Development of Experimental Methods in Electroseismics," SEG Meeting publication, 1-4, 2003.

R.D. Russell, et al., "Seismoelectric Exploration," *The Leading Edge*, 1611-1615, Nov. 1997.

\* cited by examiner

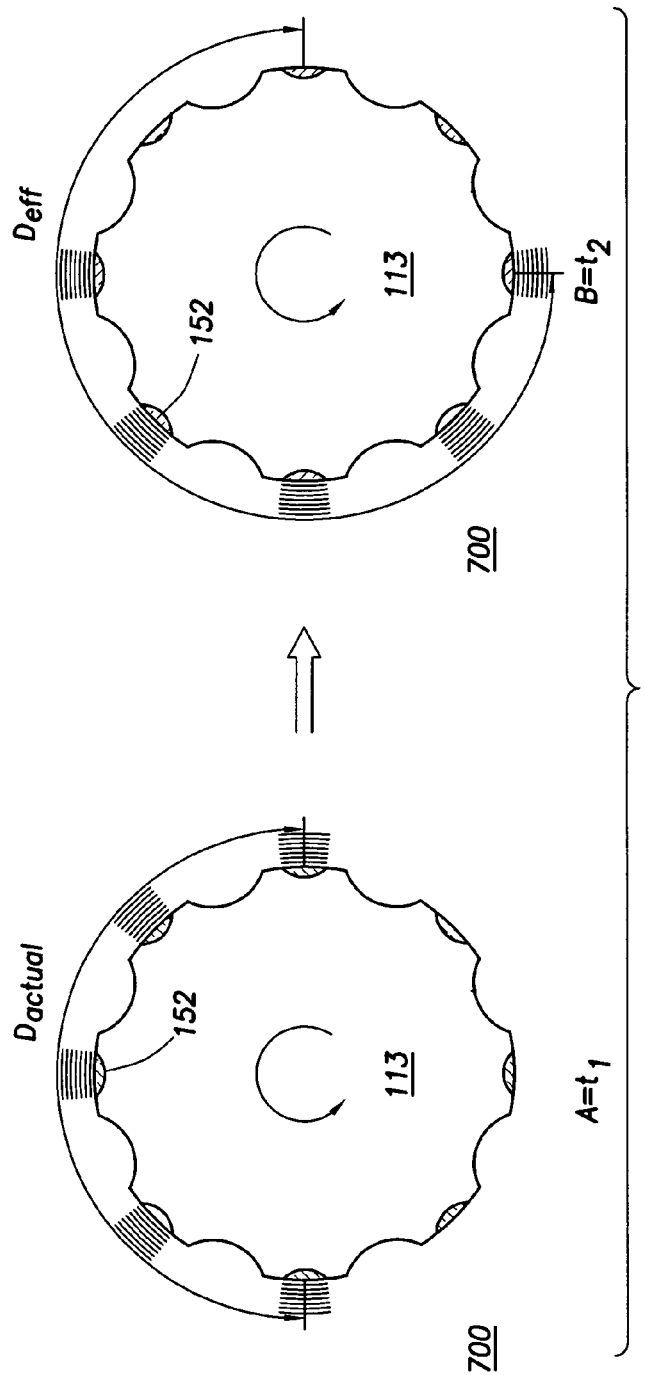
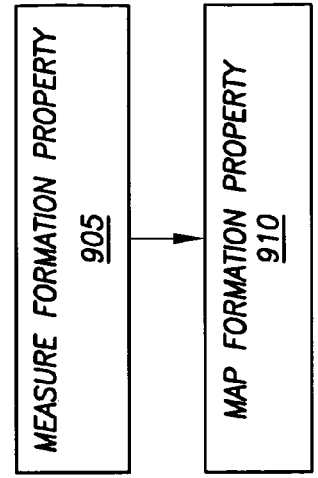
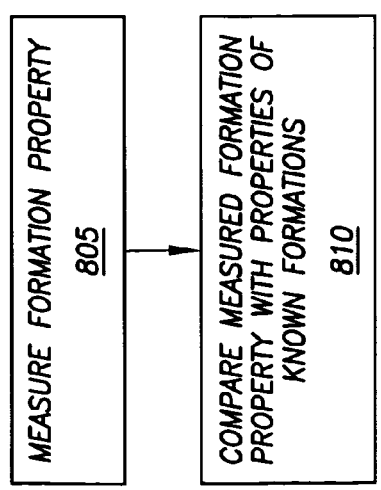

LOGGING A WELL

BACKGROUND OF THE INVENTION

To ease the process of drilling into a formation and to improve production yields for desirable formation fluids, the oilfield-services industry has developed processes and tools for measuring the properties of the formation during drilling or shortly thereafter, a process called "logging while drilling" (LWD). Integrating logging with drilling not only shortens the time needed to make the well operational, but also allows the drill operator to measure the formation's properties before drilling fluid invades the formation and obscures its properties. LWD tools and methods evaluate multiple parameters, such as formation resistivity, porosity, and various acoustic characteristics, to determine the types of minerals and/or fluids that comprise the formation. Generally, logging tools and processes involve radiation of energy, such as acoustic or electromagnetic waves, into the formation to induce energy from the formation. The characteristics of the induced energy reveals properties of the formation. Properties of particular value in the drilling process are the identity, location and relative proportions of minerals and fluids present in the formation.

LWD tools incorporate measurement devices into the bottomhole assembly in order to obtain measurements as soon as possible after the well wall is drilled. LWD tools have thus been attached to the drill string, for example, in specially adapted drill collars located just above the drill bit. The sensors incorporated into these LWD tools will typically detect formation properties at a given well depth just after the drill bit drills past that depth. While positioning the LWD tools just above the drill bit yields information about the formation before extensive drilling fluid invasion can occur, drilling fluid invasion can still mask properties of the formation.

BRIEF DESCRIPTION OF DRAWINGS

FIG. 7 illustrates a cross-sectional view of the drill bit using synthetic array techniques.

FIG. 8 illustrates a flowchart of an example process for analyzing data representing energy received with the array.

FIG. 9 illustrates a flowchart of an example process for analyzing data representing energy received with the array.

FIG. 11A illustrates an expanded region of a formation.

Figure 1:
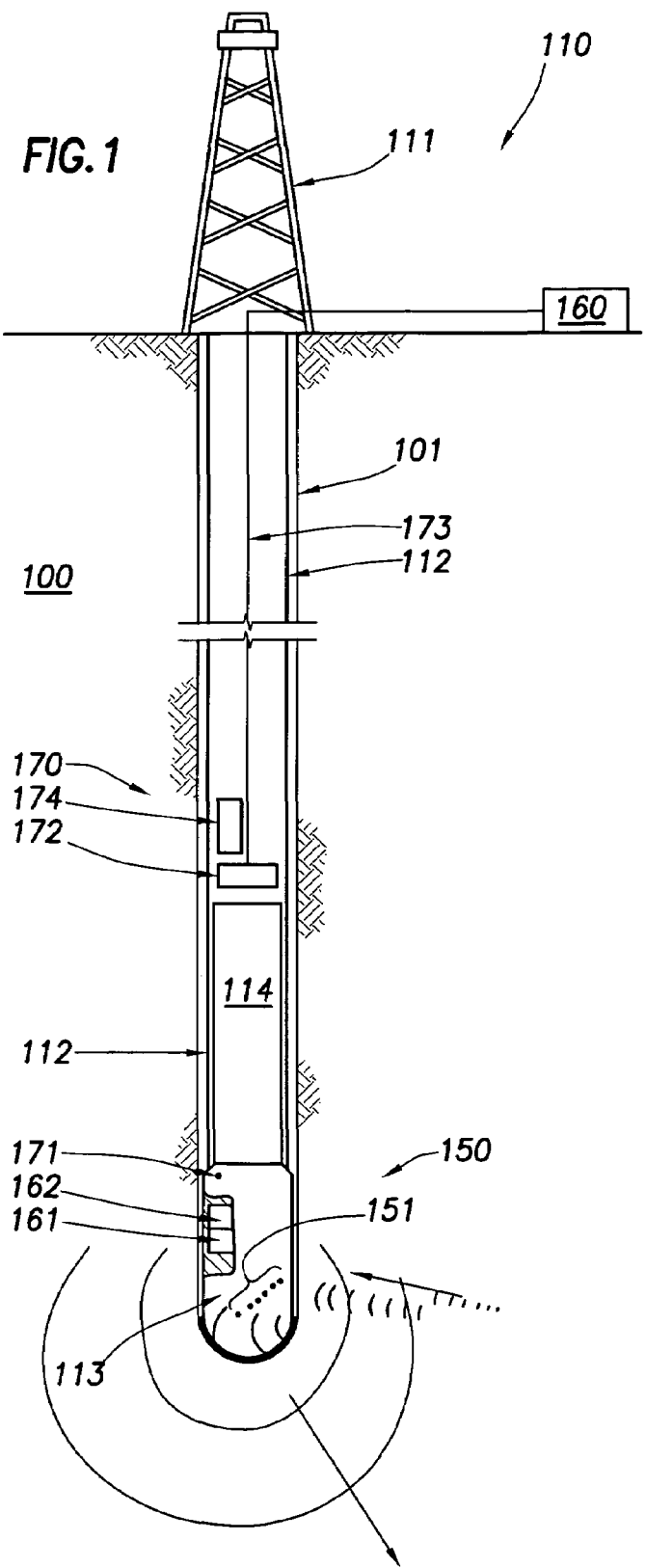
FIG. 1 illustrates a well with an example logging system.

While the present invention is susceptible to various modifications and alternative forms, specific examples thereof have been shown in the drawings and are herein described in detail. It should be understood, however, that the description herein of specific examples is not intended to limit the invention to the particular forms disclosed, but on the contrary, the invention is to cover all modifications, equivalents and alternatives falling within the spirit and the scope of the invention as defined by the appended claims.

DETAILED DESCRIPTION

FIG. 1 illustrates a formation 100 that contains a deposit of a desirable fluid such as oil or natural gas. To extract this fluid, a well 101 is ordinarily drilled in the formation 100 using a drilling system 110. In the example drilling system 110 shown in FIG. 1, a drilling rig 111 couples to a drill string 112, which in turn couples to a drill bit 113. As used herein, a drill string is defined as including drill pipe, one or more drill collars, and a drill bit. The term "couple" or "couples" used herein is intended to mean either an indirect or direct connection. Thus, if a first device "couples" to a second device, that connection may be through a direct connection or through an indirect connection via other devices or connectors. Drill string 112 may house a mud motor 114 that circulates drilling fluid present in well 101 and thereby drives the action of drill bit 113 in well 101. An alternative embodiment may include a rotary-steerable system that drives the action of drill bit 113 from the surface. The action of drill bit 113 gradually wears away the formation, creating and extending well 101. As the depth of well 101 increases, drill operators add additional drill pipe and/or drill collar segments to drill string 112, allowing drill bit 113 to progress farther into formation 100. Drill bit 113 may be steered in any direction to bring well 101 into contact with a fluid deposit.

In addition to serving as part of drilling system 110, drill bit 113 may be part of a LWD system 150. LWD system 150 may be capable of logging well 101 and may be used to measure properties of a formation proximate well 101, including properties of the formation that forms the wall of the well, properties of the formation at a distance away from the well, and various drilling parameters such as vibration and azimuth. LWD system 150 may also measure properties of any fluids present in formation 100. LWD system 150 may be used during drilling, shortly thereafter and even while tripping in or out drill bit 113. LWD system 150 may also include a processor 160 to operate LWD system 150 or to analyze measured properties of formation 100. Although FIG. 1 shows processor 160 at a surface location, processor 160 may be located inside well 101, or it may be located at or near the sea floor if drilling occurs underwater. For example, processor 160 may be located inside drill bit 113 or in drill string 112. If, however, processor 160 is located outside the well, a data storage unit 161 and a battery 162 may be provided to store the measured properties downhole. LWD system 150 may also use battery 162 as a power source.

LWD system 150 may also include a telemetry system 170 to transmit data between the surface, processor 160, and drill string 112, as FIG. 1 illustrates. For example, telemetry system 170 may transmit data representing energy received at an array of elements from drill bit 113 or from data storage unit 161 to processor 160. Telemetry system 170 may include a conventional mud pulse telemetry subsystem. In alternative examples, telemetry system 170 may employ, for example, a wireless telemetry system or an acoustic telemetry system. For example, telemetry system 170 may include a short-hop telemetry system such as an antenna 171 and a receiver 172 located downhole. In some example LWD systems, the antenna may be coupled to the drill bit 113 or the data storage unit 161. Placing receiver 172 above or inside the housing of mud motor 114 may allow telemetry system 170 to send data without impeding mud motor 114 with wires. Telemetry system 170 may then include a telemetry line 173 to transmit the signals from receiver 172 to the surface. Alternatively, telemetry system 170 may include a telemetry-receiver system 174 located downhole. Telemetry-receiver system 174 may then receive data from antenna 171 and transmit data outside well 101 wirelessly.

In the example LWD system 150 shown in FIG. 1, drill bit 113 is coupled to at least one array 151 that functions as an electronic array. Array 151 may receive at least one of reflected/refracted energy from transmissions into the formation by sensors located on the LWD system and energy from the formation proximate the well. As used herein, the term "formation" includes mineral beds and deposits, and the fluids contained therein. Also, as used herein, the term "energy" includes both acoustic waves and electromagnetic waves in all their forms. Short pulses and extended-duration wave patterns are to be included. These acoustic waves and electromagnetic waves may be characterized by a frequency, velocity and wavelength. Further, the relative locations of particular features of a wave, such as peaks or troughs, may also be characterized by a phase.

Figure 2:
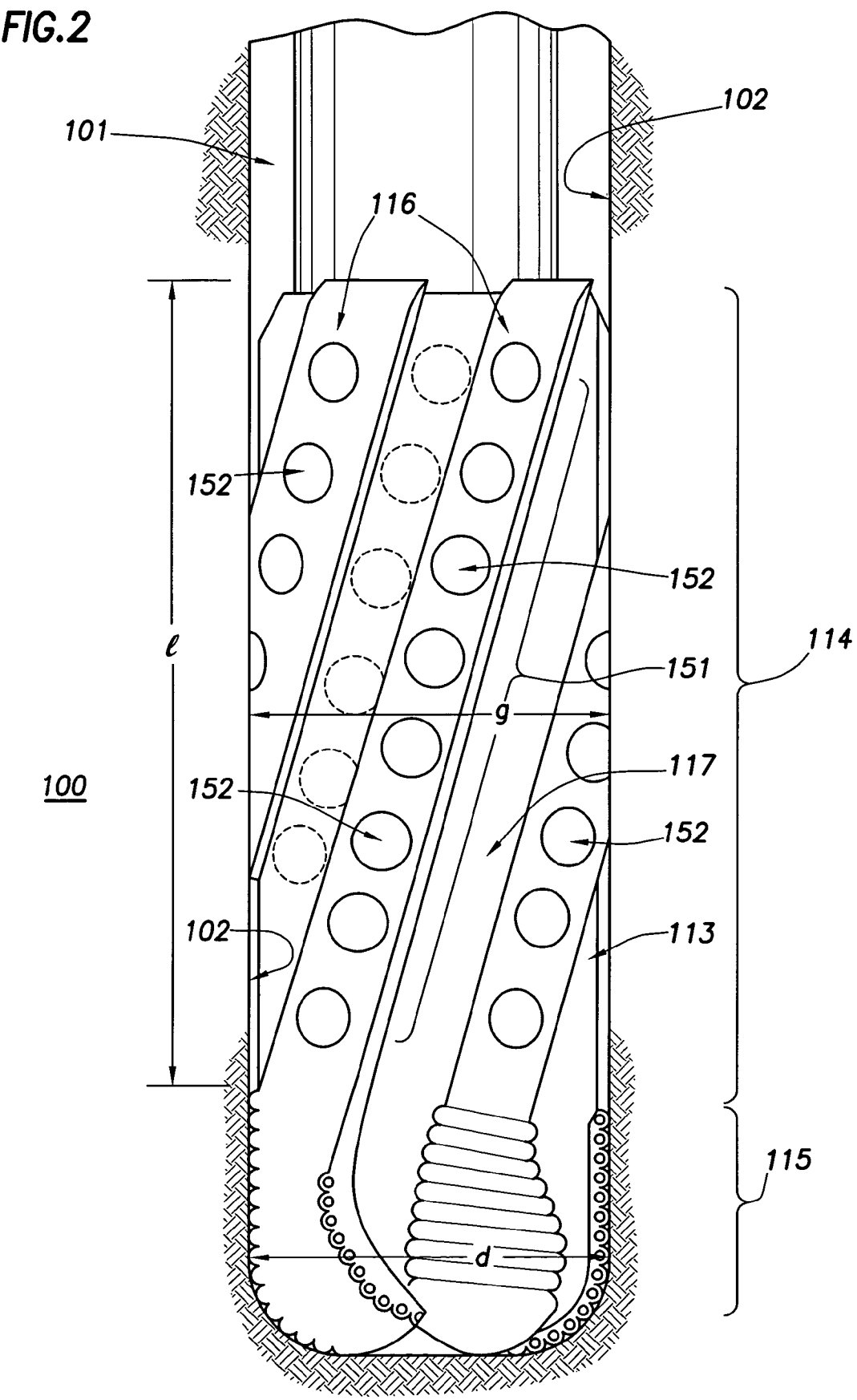
FIG. 2 illustrates a perspective view of a well containing a drill bit coupled to at least one array of elements.

During the logging process, LWD system 150 may transmit and receive energy with array 151. Array 151 is formed from one or more elements 152, as shown in FIG. 2. Elements 152 may be transducers, electrical antennae, or other sensors. For example, an embodiment may use as elements button electrodes for the transmission or reception of electromagnetic signals. Array 151 may include a combination of elements, for example, a combination of transducers and antennae, or a combination of electrodes, antennae, and transducers. Combinations of elements may allow LWD system 150 to log a combination of properties of well 101 simultaneously. Different properties reveal different information, and thus logging multiple properties can help generate a more complete picture of well 101 and also of proximate formation 100. LWD system 150 may radiate energy at formation 100. By radiating energy at the formation, LWD system 150 will induce energy from the formation. This induced energy will carry information about the properties of the formation. LWD system 150 may thus receive induced energy at array 151.

FIG. 2 illustrates an example drill bit 113. In this example, drill bit 113 has a gauge section 114 above a cutting section 115. Drill bit 113 is shown with a defining bit diameter "d" taken at its widest point along cutting section 115. Gauge section 114 has a gauge diameter "g" taken at its widest point that may be substantially equal to d. If array 151 is located on gauge section 114, the array may thus be proximate, or in contact with, interior surface 102 of well 101. In some examples of LWD system 150, drill bit 113 has a total gauge section length "l" equal to at least 75% of the defining bit diameter d. Further, in some example LWD systems, at least 50% of gauge section 114 has a gauge diameter substantially equal to the defining bit diameter. A drill bit meeting these specifications is available in the SlickBore drilling system provided by the assignee of this disclosure and is described in U.S. Pat. No. 6,581,699, assigned to the assignee of this disclosure.

In example drill bit 113, arm 116 is a spiral-shaped ridge that protrudes from gauge section 114. As illustrated in FIG. 2, at least one arm 116 may be located on gauge section 114 of drill bit 113. If gauge section 114 has an arm 116, gauge diameter "g" includes the thickness of arm 116. Arm 116 may be proximate or in contact with interior surface 102. Drill bit 113 may also have at least one groove 117. Groove 117 is recessed from arm 116. Fluid present in well 101, as well as any cuttings from formation 100 due to the drilling of the formation, may pass through groove 117. In example drill bit 113, multiple grooves 117 alternate with multiple arms 116 on gauge section 114. Alternatively, drill bit 113 may have a single groove 117 and a single arm 116.

Array 151 may include one or more elements that may be vertically, horizontally, or diagonally spaced, or include elements in a cross section of drill bit 113. In one embodiment, the elements of the array may be on arm 116, as shown in FIG. 2. In another embodiment, elements 152 of array 151 may be in groove 117, as shown by the dotted lines in FIG. 2. In still other embodiments, elements 152 may be partially on arm 116 and partially in groove 117. The best location for array 151 will depend on the chosen embodiment of LWD system 150. For some embodiments, elements 152 of array 151 may be in contact with interior surface 102 of well 101. Locating array 151 on at least one arm 116 may then be desirable, as the arm may be in direct or nearly direct contact with interior surface 102. Because fluids and cuttings in the well may pass through groove 117, locating array 151 in at least one groove 117 may be a better choice for embodiments requiring examination of fluids and cuttings in well 101. Still other embodiments may require elements 152 both in groove 117 and on arm 116.

Figure 3:
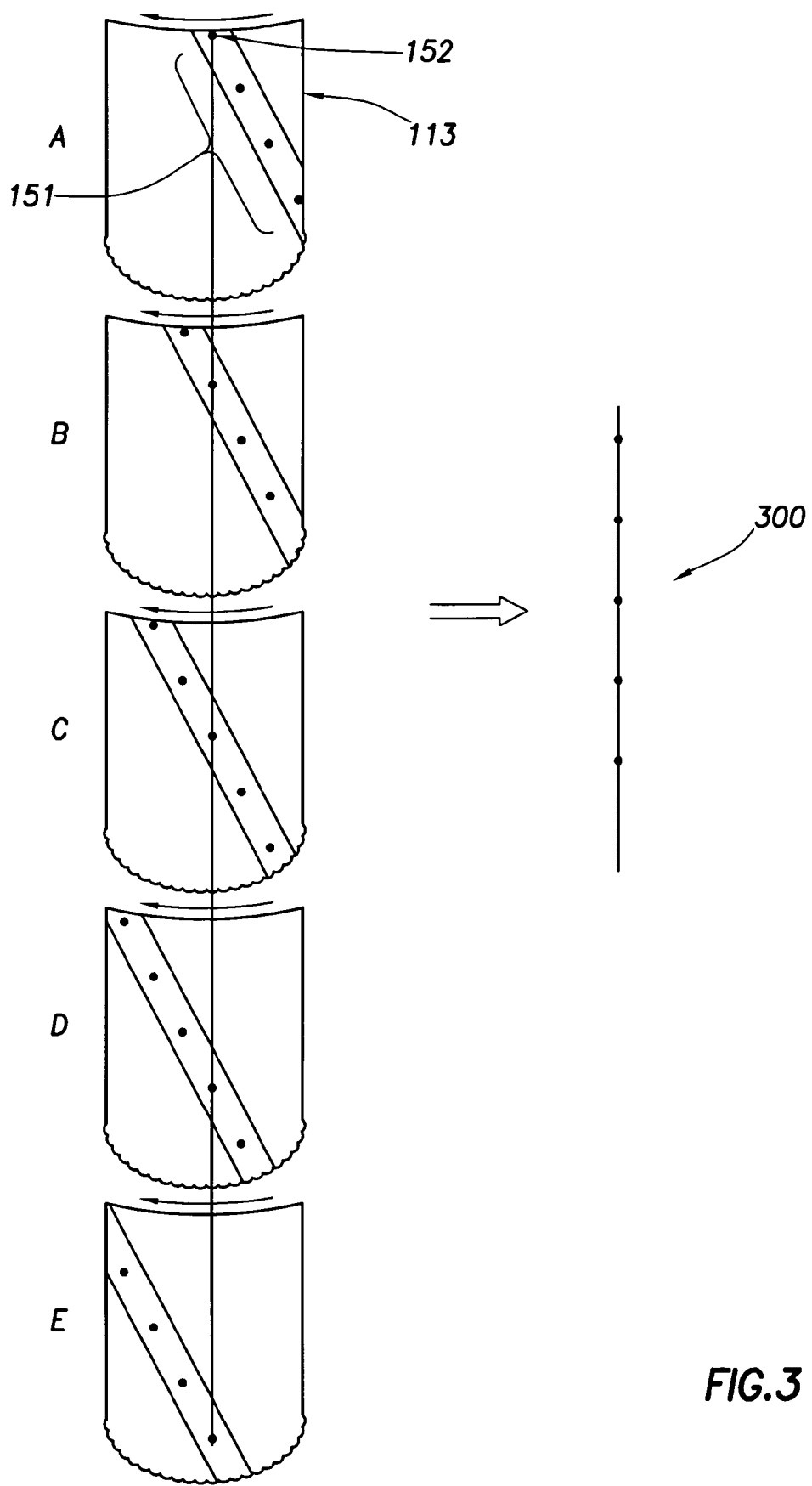
FIG. 3 illustrates use of a spiral-shaped array to simulate a vertical array.

If array 151 is located on arm 116, the array may follow the spiral shape of arm 116 as shown in FIG. 2. The same may be said for elements 152 located in groove 117. Although array 151 may also assume other configurations, such as horizontal or vertical rows on drill bit 101, spiral-shaped arrays offer unique opportunities for activation and analysis in three dimensions. Because the spiral configuration extends both vertically and horizontally along the curved surface of drill bit 113, a spiral-shaped array 151 may discern the azimuthal, elevational and range location of the source of induced energy it receives. Further, a spiral-shaped array 151 may target a specific three-dimensional region in formation 100, as later discussed. Array 151 may also have any spacing between elements 152 allowed by the physical confines of drill bit 113. For example, elements 152 may be spaced in a spiral-shaped array 151 along arm 116 such that when drill bit 113 rotates at a particular speed, elements 152 form a straight-line array over time. FIG. 3 illustrates the effect of such a spacing. Diagrams A-E in FIG. 3 show the movement of array 151 over time, with Diagram A occurring first in time, Diagram B second in time, and so on. Drill bit 113 rotates clockwise as seen from above, or right to left in FIG. 3. As drill bit 113 rotates, successive elements 152 of array 151 are aligned in a single vertical line. Energy received with elements 152 or data representing that energy may be stored in data storage unit 161 and then analyzed at a later time as though the energy was received with a vertical array 300 rather than the spiral-shaped array 151 shown in FIG. 3. Further, the rotation speed may be varied to alter the shape of array 151 as well.

Figure 4:
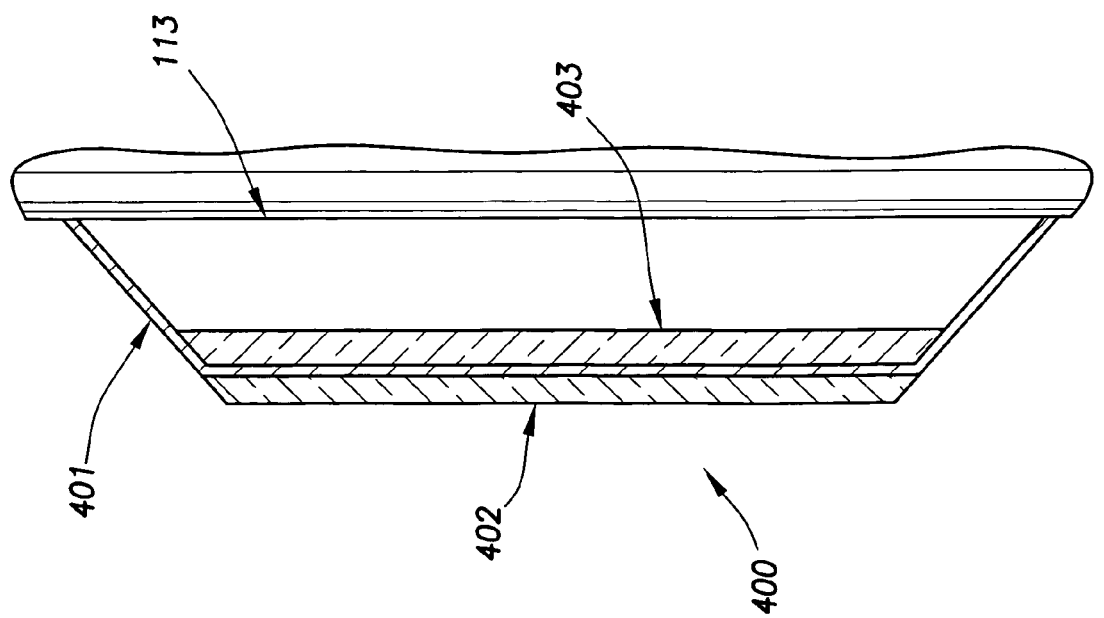
FIG. 4 illustrates a cross-sectional view of a bender bar transducer.

The forms of the elements in the array may vary as well. For example, elements 152 may be bender bar transducers capable of transmitting and receiving acoustic energy. FIG. 4 illustrates in perspective view an example bender bar transducer 400 coupled to drill bit 113. Bender bar transducer 400 is formed from a flexible surface 401 that may be pyramidal in shape, as FIG. 4 illustrates. Piezoelectric crystals 402 and 403 couple to opposing sides of flexible surface 401. Incoming induced acoustic energy distorts flexible surface 401, and piezoelectric crystals 402 and 403 will convert this distortion into electrical signals representing the acoustic energy. Subsequent processing may convert those electrical signals into data that may be transmitted to processor 160. In some examples of LWD system 150, bender bar transducer 400 may be located on at least one arm 116 or in at least one groove 117 of drill bit 113. In alternative examples of LWD system 150, elements 152 may be acoustic transducers small enough to fit a plurality of transducers on a single arm 116 of drill bit 113. These small acoustic transducers may be conventional piezoelectric transducers. Small acoustic transducers will generally operate at higher frequencies than the bender bar transducers and thus may be useful in different embodiments. A transducer generally delivers its peak energy when it is activated near its natural frequency, which is directly proportional to its size. Small transducers therefore generally produce higher resonance frequencies than larger transducers. Bender bar transducers, in contrast, are generally known as large transducers that produce lower-frequency output at higher energies.

Any LWD system 150 may allow elements 152 to be individually controlled, no matter which type of transducer is used. In one embodiment, each of the elements 152 of array 151 may be individually controlled, for example, by processor 160. Processor 160 may thus use a first element in a first array to transmit energy and a second, different element in either the same array or a different array to transmit energy simultaneously or sequentially with the first element. In one embodiment, at least one of monopole, dipole, quadrupole, and hexapole acoustic signals may be transmitted from the one or more arrays 151 disposed on drill bit 113, and also, because of the independent control of each of the elements in array 151 by processor 160, any one or more transducers in the array may be used as a receiver. Thus, all receivers in a particular horizontal or vertical, diagonal plane may be turned on to receive the transmitted signal, thereby permitting the measurement of azimuth or direction of a formation bed or boundary. This measurement may also allow for drilling in a particular formation or bed.

Figure 5:
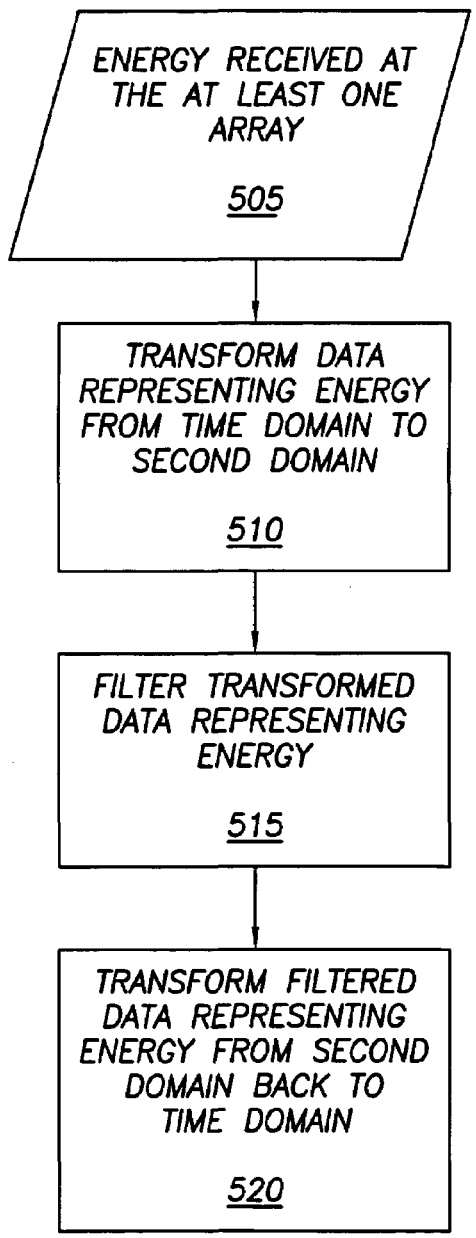
FIG. 5 is a flow chart showing a process of enhancing data representing energy received with an array.

Data representing energy received with array 151 may incorporate unwanted noise that impedes accurate logging. LWD system 150 may therefore enhance the data by processing the data to reduce the effect of the noise. If LWD system 150 includes processor 160, processor 160 may itself include the components and instructions necessary to enhance the data. In some instances, the noise may be difficult to remove while the data remains in the time domain. If so, the data representing the energy received with array 151 (block 505) may first be transformed from the time domain into a second domain in which noise can be eliminated (block 510), as the flowchart in FIG. 5 shows. Once in the second domain, the transformed data may be filtered with at least one filtering algorithm to remove the noise (block 515). Then LWD system 150 may transform the filtered data from the second domain back to the time domain (block 520). The signal-conditioning algorithm used to enhance the data will vary with the applications for LWD system 150. In some examples, the best choice for the second domain may be the frequency domain because the frequency domain allows for selective filtration of unwanted frequencies from the data. To enhance the data, LWD system 150 may then apply a Fourier Transform (FT) to the induced energy to transform the data from the time domain to the frequency domain. After filtration, LWD system 150 may apply an inverse FT to the filtered data to transform the date from the frequency domain back to the time domain.

Collectively, elements 152 behave as one or more electronic arrays. Array 151 may thus offer all the functionalities seen in other electronic arrays. For example, LWD system 150 may include a "beam-forming" subsystem that focuses array 151 to form at least one directional beam to scan regions of formation 100 proximate well 101. A beam-forming subsystem is a spatial system that operates on the output of an array of sensors to enhance the amplitude of a coherent wavefront relative to background noise and directional interference. This beam-forming subsystem may be included in processor 160. Using the beam-forming subsystem, because the elements may be independently controlled, the direction in which the radiation pattern of array 151 points may be altered electronically, even though the array itself is substantially stationary. This beam-forming subsystem may allow array 151 to act as a directional energy source targeting a particular region of formation 100. This beam-forming subsystem may also allow array 151 to be steered to determine the direction from which the energy induced from the formation originated. If array 151 assumes a spiral-shape, the array may act as a directional energy source targeting a three-dimensional region of formation 100. Similarly, a spiral-shaped array 151 may even be steered to determine the three-dimensional coordinates for the location from which energy induced from the formation originated.

Figure 6:
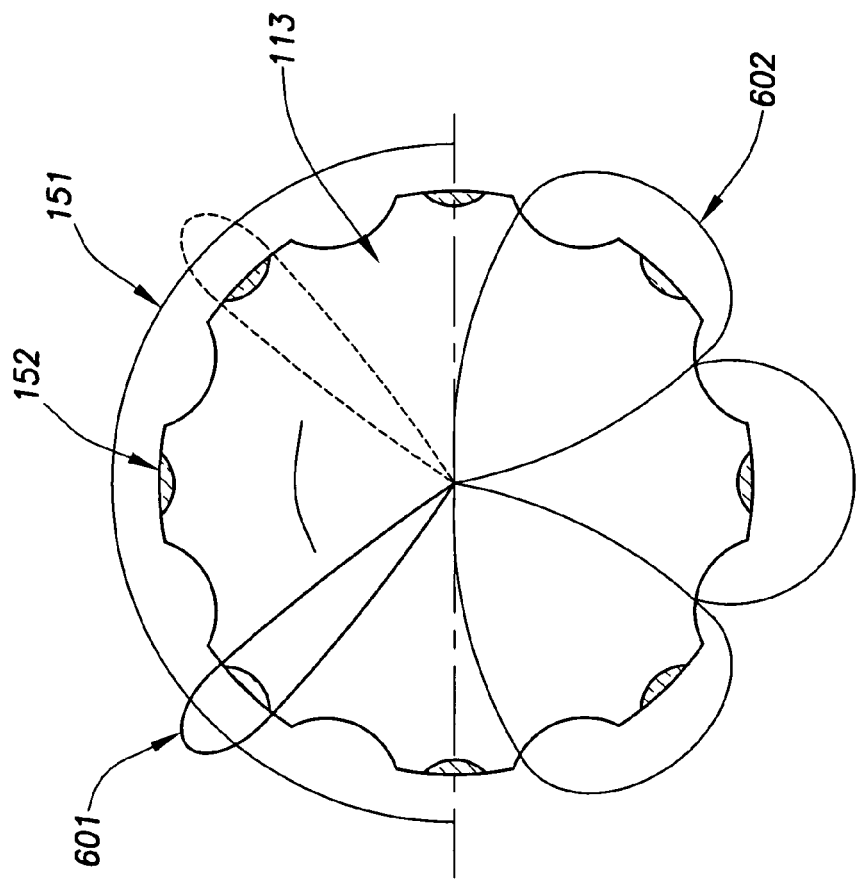
FIG. 6 illustrates a cross-sectional view of the drill bit with example radiation patterns.

FIG. 6 illustrates a cross-sectional view of an example drill bit 113 with elements 152 and a sample radiation pattern 601. For simplicity, radiation patterns are shown in FIG. 6 in two dimensions. It will be understood that the radiation patterns are actually three-dimensional patterns. Array 151 is shown as a horizontal two-dimensional array around the circumference of drill bit 113 for simplicity. Radiation pattern 601 arises through constructive and destructive interference between radiation from various elements 152. Radiation patterns can be adjusted to have a strong signal in one direction in preference to other directions to form a beam, as seen in radiation pattern 601. The spacing between array elements 152 may be altered to redirect the beam. The direction of the beam, however, may also be altered electronically by varying the phases, frequencies, amplitudes and times of activation for energy transmitted from array 151. By changing the amplitude and phase of the transmitted energy, for example, the directional beam of radiation pattern 601 may be steered in a clockwise rotation, as indicated by the top half of FIG. 6. The same effect may be produced through frequency shifts or time delays. Regions of the formation may therefore be actively scanned by gradually moving the beam through changes in the phase, frequency, amplitude and time of activation of array 151. If array 151 is a spiral-shaped or other three-dimensional array, LWD system 150 may steer the beam in three dimensions. Further, rotation of the LWD system 150 causes scanning of the beam in two dimensions.

Beam-forming processes may not only be used to actively scan a formation proximate a well but also may be used to passively create several beams covering multiple regions of the formation, resulting in a radiation pattern similar to radiation pattern 602 shown in the bottom half of FIG. 6. With radiation pattern 602, array 151 may both receive energy induced from multiple regions of formation 100 simultaneously and locate the source of received energy. Active beam-forming may be most useful for methods, in which elements 152 radiate energy, while passive beam-forming may be most useful for methods in which elements 152 merely receive energy. However, passive beam-forming may still be used to radiate energy at multiple regions of the formation. In either case, the beams do not originate from individual elements 152 but rather arise out of the full aperture of array 151. By focusing array 151 into directional beams, LWD system 150 can be used to determine the directionality of properties of the formation and accompanying fluids from the induced energy received with the array.

If LWD system 150 is activated while the drill bit is rotating within the well, it may exploit this motion to synthetically expand the aperture of array 151 while radiating and receiving energy, thereby increasing the resolution of the array. This effect may be achieved through signal processing alone, without the use of larger physical arrays. These "synthetic aperture" techniques can be used to generate high-resolution images, for example, of interior surface 102 or even a surface area at some depth of investigation into a formation proximate the well. Using a synthetic aperture subsystem, a large array may be synthesized over a finite period of time by collecting a series of data returns from a smaller physical array that is moving relative to the target. The series of returns may be combined and analyzed as if it had been received by a synthesized array that is larger than the actual physical array used. Array 151 may essentially be used as a single, large element: when array 151 acts as a transmitter, one or more elements 152 that form the array may radiate energy simultaneously, and when the array acts as a receiver, one or more elements in the one or arrays may receive energy simultaneously. At each position along the movement of drill bit 113, array 151 may radiate energy and receive energy. Data representing the energy may be saved in data storage unit 161. If memory storage capacity is an issue, characteristics of the received energy may be stored, rather than storing data representing all of the received energy. Thus the data storage unit 161 may save the amplitude, phase and/or the arrival times of the received energy. Data representing received energy may be stored in memory until array 151 has traversed through a distance $D_{eff}$. The collected data may be analogous to the data a synthetic array of size $D_{eff}$ would have received. This collected data may thus be processed as though the data came from an array of size $D_{eff}$, resulting in the appearance of examination by a larger array. Processing may be completed downhole in situ or at the surface, using, for example, processor 160.

FIG. 7 illustrates the operation of a synthetic aperture subsystem 700 with simplified diagrams of elements 152 shown on a cross-section of drill bit 113. Elements 152 receive energy at time 1 ($t_1$), shown in Diagram A, and at time 2 ($t_2$), shown in Diagram B. Drill bit 113 rotates from time $t_1$ to $t_2$, moving elements 152. If LWD system 150 appropriately controls the time and phase characteristics of radiating energy relative to the time and phase characteristics associated with receiving energy at array 151, the effective aperture of the array will increase from $D_{actual}$ to $D_{eff}$. This effective aperture is the "synthetic aperture" of array 151. The "synthetic aperture" is a mathematical technique of image processing to enhance beyond the limited aperture of actual transducer/transducer array. The size of the synthetic aperture will be a function of the time and characteristics of radiating and receiving energy, as well as a function of array length or the motion of the drill bit. The motion of the drill bit will be used the array separation using a single element 152 transmitting and receiving receiving with constant time. The synthetic array may be focused for multiple depths or ranges into the formation by adjusting the phases (delay-and-sum) of the data representing the received energy before processing, unlike physical arrays that may be focused only for one range or depth. Further, the azimuthal resolution of a focused synthetic array may be greater than the resolution of a physical array of the same size. The azimuthal resolution of a focused synthetic array may be independent of the range of the particular elements used as well as the wavelength of the incident energy. If desired, processor 160 may provide the processing necessary for synthetic aperture subsystem 700.

As the drill bit rotates and cuts in the well, it will generate acoustic waves that radiate into formation 100. Drill bit 113 may thus radiate energy independent of array 151. This radiated acoustic energy in turn induces acoustic energy that includes desirable information about properties of formation 100 and fluids present therein. Array 151 may accordingly include one or more acoustic transducers that act as an electronic array. Once array 151 receives energy, LWD system 150 may analyze the received energy to further understand the properties of formation 100. As the flowchart in FIG. 8 illustrates, LWD system 150 may, for example, measure a property of formation 100 (block 805) and then compare the measured property with stored properties of known formations to determine the composition or structure of formation 100 (block 810). Processor 160 may thus include the components and instructions necessary to complete this analysis.

One property of particular interest is the velocity at which acoustic energy propagates in formation 100. Velocity measurements can reveal information about the lithology and texture of formations proximate well 101 as well as their porosity. Velocity measurements can also help distinguish between different types of fluids present in the formation 100, such as between natural gas and oil. If necessary, velocities for received energy may be measured indirectly. LWD system 150 may thus measure an interval transit time (Δt) for formation 100 from received energy and then convert Δt into a velocity. The interval transit time is often measured in microseconds per foot and represents the amount of time a wave takes to travel a given distance in a formation. Measured Δts are as much a characteristic of a formation as velocity and may thus be analyzed without a conversion to velocity. The interval transit time is merely the reciprocal of velocity, however, and thus converting Δts to velocities is a simple matter.

Figure 10:
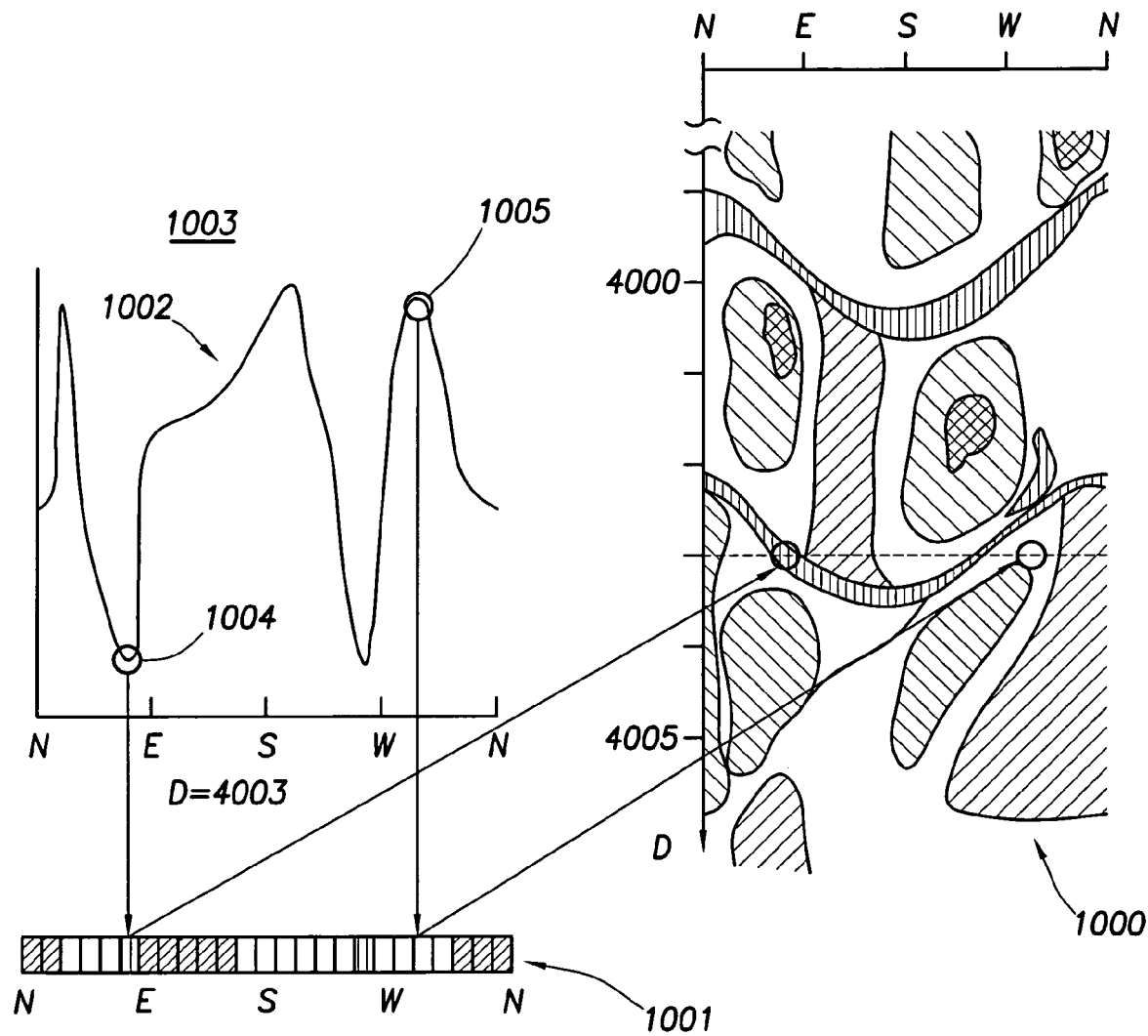
FIG. 10 illustrates an example map of a measured property of a formation.

LWD system 150 may also take various measured properties of formation 100 and fluids contained therein (block 905) and map them (block 910), as the flowchart in FIG. 9 shows. For example, LWD system 150 may map interval transit times or amplitudes of energy induced from the formation. The amplitude of induced energy indicates acoustic impedance and elasticity for formations. FIG. 10 displays an example map 1000, which may represent any formation property, including amplitude. Along the vertical axis, map 1000 may plot well depth, with depth increasing toward the bottom of the map. For simplicity, the example map 1000 includes only a region from about 3,998 feet to about 4,006 feet in depth. Alternative maps may cover the full well depth along the vertical axis. The regions of formation 100 are plotted along the horizontal axis of map 1000 as cardinal directions.

To generate an amplitude map, LWD system 150 may measure an amplitude for energy received with each element. Because each element has a known location relative to regions of the formation, the location for the amplitude measurement will be known relative to regions of the formation. Example amplitude measurements have been plotted on the left side of FIG. 10 as line 1002 in graph 1003. In this example, graph 1003 will plot the regions of the formation along the horizontal axis and amplitude along the vertical axis. This example graph 1003 is for amplitudes measured at a well depth of 4,003 feet.

Each amplitude measurement may be represented as a pixel in a pixel matrix for the given depth. FIG. 10 displays an example pixel matrix 1001. The regions of the formation are plotted on the horizontal axis as cardinal directions. Each point on graph 1003, such as points 1004 and 1005, may be represented as a pixel in pixel matrix 1001. Each pixel in the pixel matrix may be assigned a color or, in the case of black and white pixel matrix 1001, a pattern. Each possible numerical value for the amplitude measurement may be assigned a particular color or pattern, and every pixel containing the same amplitude measurement may be assigned the same color or pattern. The pixel matrices for multiple well depths may then be combined to create a map 1000 for formation 100. Example map 1000 represents pixel matrices from a depth of about 3,999 feet to a depth of about 4,006 feet, but again, a map may cover the entire well depth if desired. Further, the property maps may take a different form entirely if specific embodiments so require.

Formations may also be mapped based on the property measurements. For example, amplitude measurements for received energy may be used to find elasticities (reflectances) for each formation. This elasticity data may in turn be used to determine the lithology of each formation, which may then be mapped. That is, the calculated elasticities may be compared with elasticities for known formations to identify the minerals present in the formation.

LWD system 150 may also radiate energy from at least one element 152. At least two elements 152 may receive the energy. Array 151 may be formed of "pitch-catch" transducers: that is, some transducers may transmit, or "pitch," the energy, while others transducers may receive, or "catch," the energy. Alternatively, at least one element 152 may be a pulse-echo transducer that both radiates and receives energy in sequence. Elements 152 may radiate energy in a frequency sweep, including a wide-band signal such as a chirp frequency sweep, as desired. Elements 152 may also radiate energy with predetermined waveforms other than broad or chirp frequency sweeps. For example, processor 160 may transmit a signal having a predetermined waveform to the transmitting element 152, which then transmits a wave having the same waveform. LWD system 150 may also calibrate the predetermined waveform to optimize production of energy from a particular formation. To calibrate the predetermined waveform, LWD system 150 may radiate a first incident wave, measure an induced wave to determine some properties of the particular formation, and then radiate a second incident wave with a predetermined waveform selected to optimize production of energy.

Elements 152 may be acoustic transducers that radiate incident acoustic energy and also receive acoustic energy from the formation. LWD system 150 may then measure and map properties of the formation 100 from this received acoustic energy. LWD system 150 may also examine features of interior surface 102, for example, borehole dimensions. LWD system 150 may thus receive energy with array 151 from the part of the formation proximate the well that forms interior surface 102. LWD system 150 may also radiate energy at interior surface 102 from array 151. Array 151 may then receive induced energy, such as refracted and reflected acoustic waves from interior surface 102. LWD system 150 may then measure a time differential between radiation of the incident acoustic energy and receipt of the induced acoustic energy from the interior surface for each transducer. LWD system 150 may also map the measured time differentials to create an image of the interior surface. This image may reveal structural details of interior surface 102, such as fractures. LWD system 150 may also map amplitudes measured from energy induced from interior surface 102.

Figure 11:
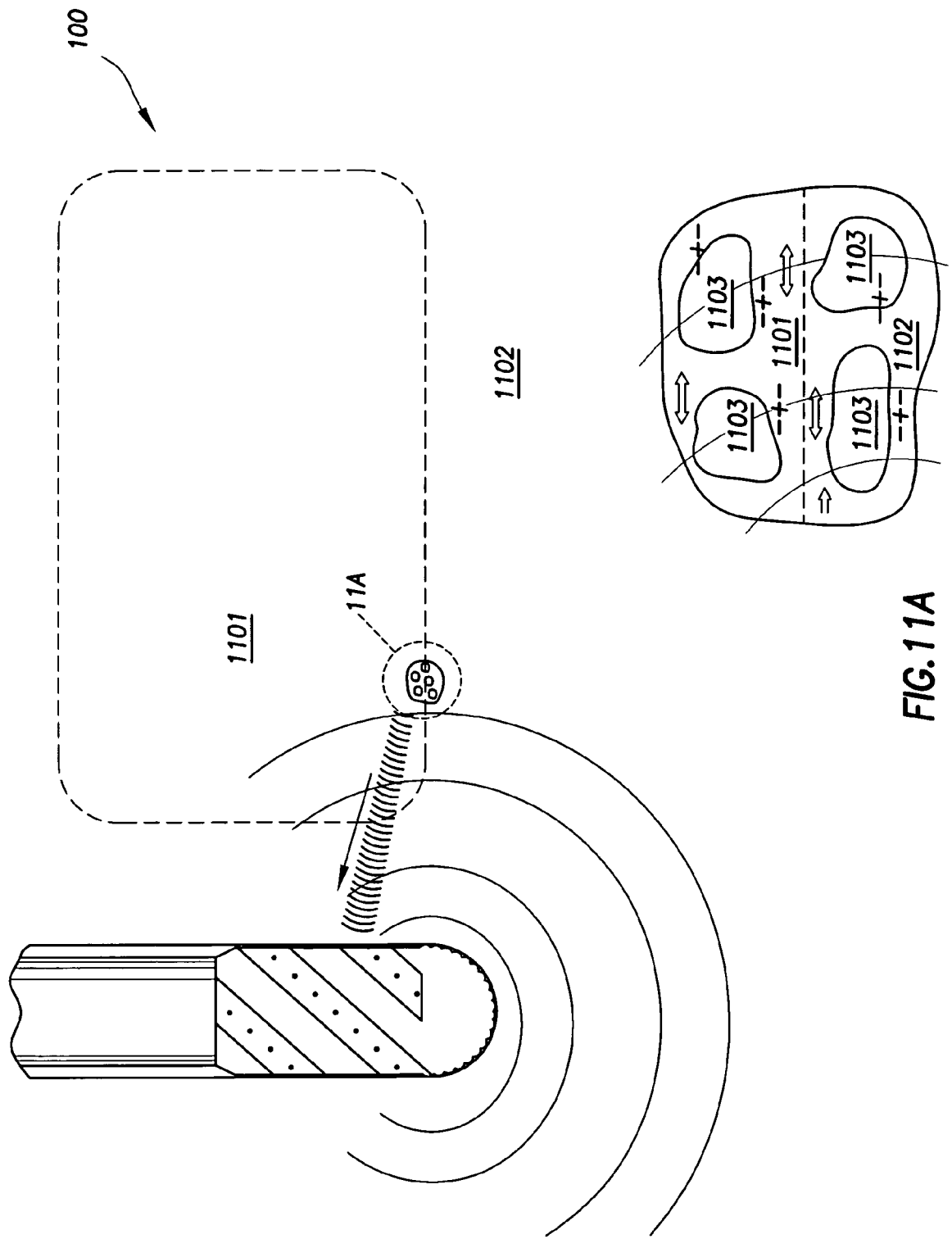
FIG. 11 illustrates a perspective view of an example logging system that radiates acoustic waves and receives induced electromagnetic waves from fluids in a formation proximate the well.

In some embodiments, elements 152 may be electrical antennae or electrodes. These electrical antennae or electrodes may receive electromagnetic energy from the formation. For example, acoustic energy radiated at formations may not induce only acoustic energy, but may also induce electromagnetic energy from the movement of formation fluids. FIG. 11 illustrates this phenomenon generally. As acoustic energy radiates on formation 100, a portion of the acoustic energy is converted to slow pressure waves wherever the acoustic impedance of fluids in the formation changes. The acoustic impedance may change, for example, at a natural boundary between natural gas and water in formation 100, denoted in FIG. 11 by the dashed line. The area of formation 100 enclosed by the dashed line contains natural gas 1101 and the area outside contains water 1102. The slow pressure waves displace fluids 1101 and 1102 and grains 1103 of the formation, as shown by the arrows in the expanded region of formation 100 illustrated in FIG. 11A. This motion displaces electric dipoles present on the surfaces of grains 1103, generating an electric field known as the "streaming potential" in formation 100. This streaming potential varies with time as the acoustic energy varies and produces electromagnetic energy that may be detected by electrical antennae coupled to the drill bit. LWD system 150 may thus use an array of electrical antennae as array 151.

The properties measured from induced electromagnetic energy may be compared with stored properties of known formations containing known fluids to determine the properties of any fluids present in formation 100. The identities and locations these fluids may also be mapped in a process similar to mapping the identities and locations of minerals present in formation 100. Additionally, LWD system 150 may use comparisons to measure at least one porosity for formation 100.

Figure 12:
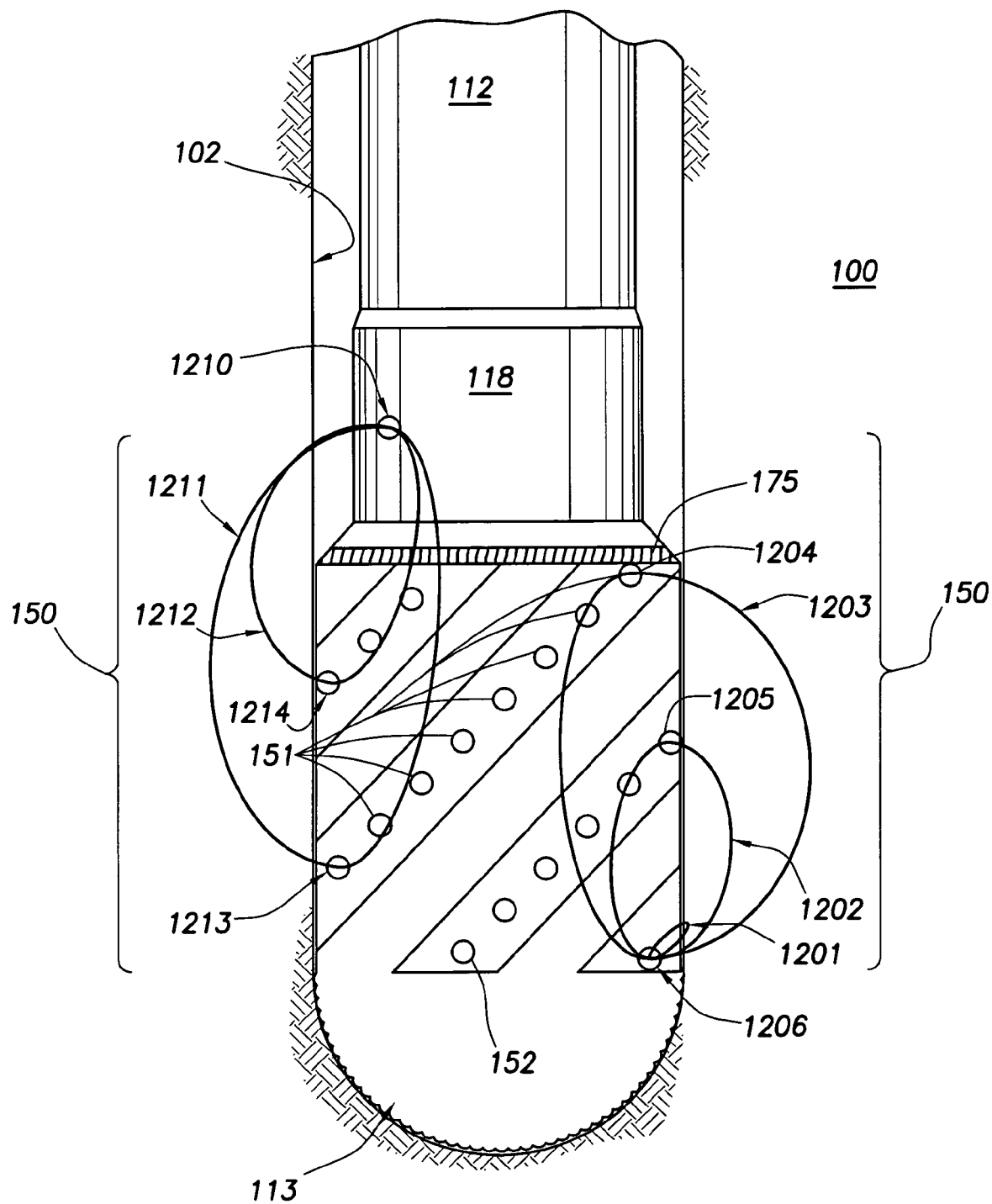
FIG. 12 illustrates a perspective view of an example logging system with flux lines extending into a formation proximate the well.

Alternatively, elements 152 may be electrical antennae that radiate incident electromagnetic energy and then receive induced electromagnetic energy. These LWD systems 150 may measure at least one resistivity for the formation. LWD system 150 may measure even multiple resistivities for the formation at different depths of investigation into formation 100. The right half of the drill bit illustrated in FIG. 12 shows an example drill bit 113 with an array of electrical antennae 151 measuring multiple resistivities of formation 100. To measure the resistivity, electrical antennae 152 on drill bit 113 create flux lines such as example flux lines 1201, 1202 and 1203. In this case, electrical antennae 1204 and 1205 act as transmitters, while electrical antenna 1206 acts as both a transmitter and a receiver. Other configurations for generating flux lines, however, are possible, and LWD system 150 may use any number of electrical antennae to create the flux.

As illustrated in FIG. 12, each flux line differs in shape, depending on the distance between the pair of antennae generating the flux. As a result, the flux lines extend into different "depths of investigation" into formation 100: flux line 1201 is quite shallow, while flux line 1203 is relatively deep. The deeper the depth of investigation, the more likely the resistivity measurements will be unaffected by invasion from fluids present in the well. By measuring resistivity at multiple depths of investigation one can compute the true formation resistivity, $R_t$, the resistivity of the invaded formation, $R_{xo}$, and the depth of invasion, $D_i$. Furthermore, by taking resistivity measurement at multiple azimuthal locations at a given well depth, additional information is gathered that allows the calculation of formation dip, fracture location, and fracture width. LWD system 150 may also compare and map resistivity for formation 100.

Alternative examples of LWD system 150 may radiate energy from at least one electrical antenna coupled to a drill collar 118. At least one array 151 on drill bit 113 may then receive energy. The left side of FIG. 12 illustrates an example LWD system 150 with a drill collar 118 coupled to an electrical antenna 1210. Drill collar 118 is coupled to drill bit 113 on one end and to the rest of drill string 112 on the other. The surface of drill collar 118 may be recessed in comparison to drill bit 113 such that drill collar 118 does not contact interior surface 102 of well 101. Electrical antenna 1210 may create flux lines 1211 and 1212 with electrical antennae 1213 and 1214. Electrical antennae 1213 and 1214 form part of array 151 on drill bit 113. Rather than having only a single electrical antenna 1210, drill collar 118 may include at least one array of electrical antennae that radiate incident electromagnetic energy at formation 100. LWD system 150 may approximate a true formation resistivity or map resistivities for the formation, as desired.

Figure 13:
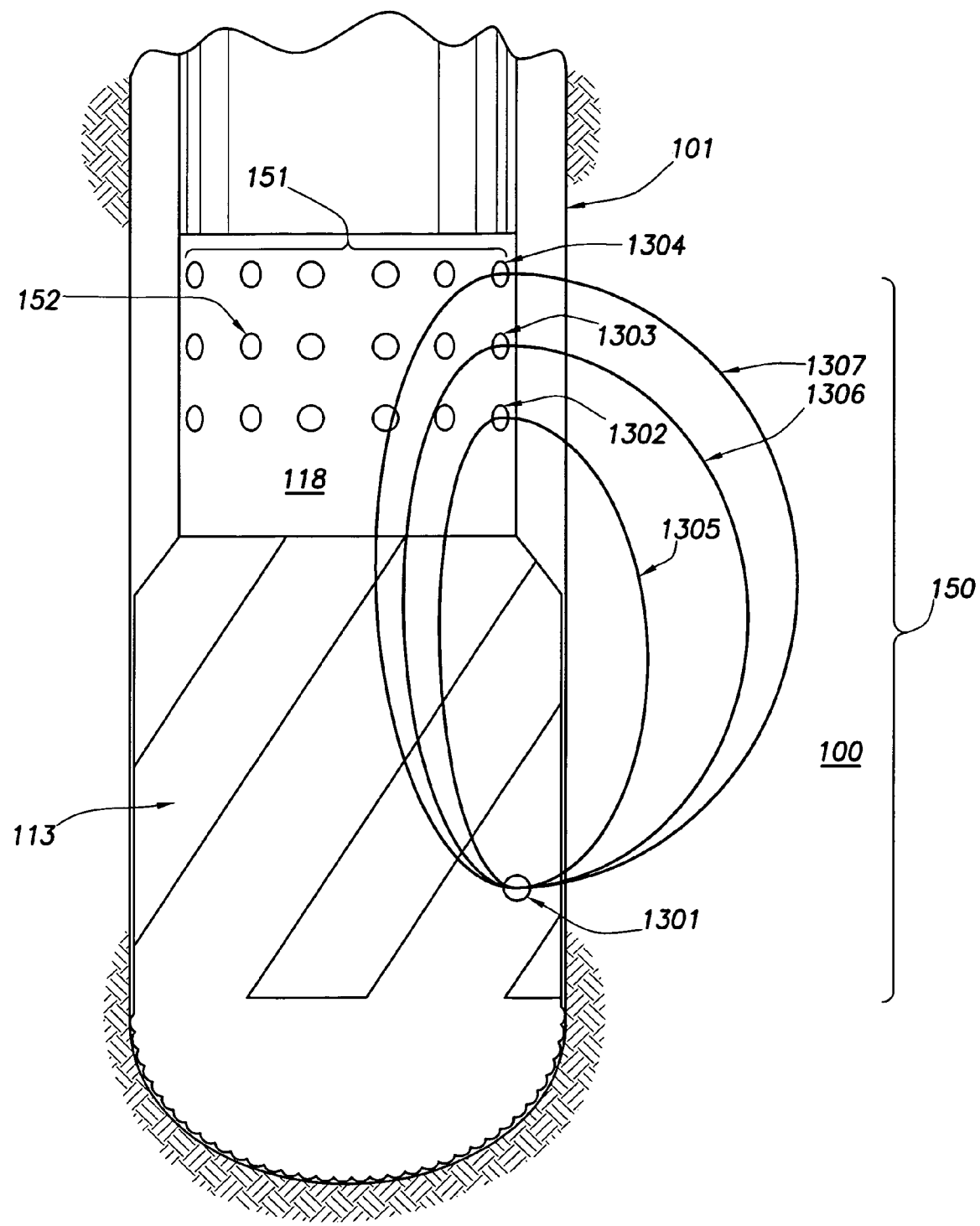
FIG. 13 illustrates a perspective view of an example logging system with flux lines extending into a formation proximate the well.

Alternatively, LWD system 150 may radiate energy from at least one element coupled to drill bit 113 and receive energy at array 151 coupled to drill collar 118, as shown in FIG. 13. These elements may also be electrical antennae. In the example shown in FIG. 13, electrical antenna 1301 creates flux lines 1305, 1306 and 1307 with electrical antennae 1302, 1303 and 1304, respectively. Electrical antennae 1302, 1303 and 1304 form at least part of array 151. As with the methods and apparatuses shown in FIG. 12, the flux lines shown in FIG. 13 extend to different depths of investigation in formation 100 depending on the distances between electrical antennae 1301 and 1302, 1303 or 1304. Accordingly, LWD system 150 may be used to approximate a formation resistivity or map resistivities for formation 100.

In view of the wide variety of permutations to the embodiments described herein, this detailed description is intended to be illustrative only, and should not be taken as limiting the scope of the invention. For example, while embodiments are described in which the electrical antennae transmit energy into the formation, in one embodiment, cutting surface 115, illustrated in FIG. 12, may transmit electromagnetic waves in the formation by putting a toroid 175 in a groove disposed in or above the gauge section that is substantially transverse or substantially diagonal to a longitudinal axis of drill bit 113. Toroid 175 may induce current in the drill bit that may be sent into the formation, for example, through cutting surface 115. Current from the formation may be received by one or more elements in array 151, wherein the received current is a measure of formation resistivity. To further illustrate different permutations included herein, while FIG. 12 illustrates a single electrical antenna 1210 radiating energy from drill collar 118, in some embodiments, an array of electrical antennae on drill collar 118, similar to the array on drill collar 118 shown in FIG. 13, may also radiate energy. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method for logging a well, including receiving energy with at least one array of elements coupled to a drill bit, wherein the at least one array of elements functions as an electronic array;
   focusing the at least one array of elements to form at least one directional beam; and
   scanning regions of a formation proximate the well with the at least one directional beam.

2. The method of claim 1, wherein at least one element of the at least one array of elements is an acoustic sensor.

3. The method of claim 1, wherein at least one element of the at least one array of elements is an electrical antenna.

4. The method of claim 1, wherein at least one element of the at least one array of elements is an electrode.

5. The method of claim 1, further including enhancing data representing the received energy.

6. The method of claim 5, wherein enhancing data representing the received energy includes:
   transforming the data from a time domain to a second domain in which noise can eliminated,
   filtering noise from the transformed data in the second domain with at least one filtering algorithm, and
   transforming the filtered data from the second domain back to the time domain.

7. The method of claim 1, further including transmitting data representing the received energy.

8. The method of claim 1, wherein focusing includes activating the elements with at least one beam-forming shift, wherein a beam-forming shift is a frequency shift, phase shift, amplitude shift or time delay.

9. The method of claim 1, further including radiating energy.

10. The method of claim 9, wherein radiating energy includes radiating energy as a result of action of the drill bit inside the well.

11. The method of claim 9, wherein radiating energy includes radiating energy from a toroid.

12. The method of claim 9, wherein radiating energy includes radiating energy from the at least one array of elements.

13. The method of claim 12, further including controlling time and phase characteristics associated with receiving energy relative to time and phase characteristics associated with radiating energy to create at least one synthetic array.

14. The method of claim 1, further including analyzing data representing the received energy.

15. The method of claim 14, wherein analyzing data representing the received energy includes:
   measuring at least one property of a formation proximate the well,
   comparing the at least one measured property with stored properties for known formations, and
   mapping the at least one measured property.

16. The method of claim 1, wherein receiving energy includes receiving electromagnetic energy with at least one array of electrical antennae.

17. The method of claim 16, wherein receiving electromagnetic energy includes receiving electromagnetic energy induced by motion of fluids in a formation proximate the well.

18. The method of claim 1, wherein receiving energy includes receiving energy induced from fluids in the well.

19. The method of claim 1, wherein receiving energy includes receiving energy induced from cuttings in the well.

20. A method for logging a well, including:
radiating energy from at least one element coupled to a drill collar,
receiving energy with at least one array of elements coupled to a drill bit, and
scanning regions of a formation proximate the well with at least one directional beam;
wherein the drill bit is coupled to the drill collar, and wherein the at least one array of elements functions as an electronic array; and the electronics array is configured to form at the least one directional beam.

21. The method of claim 20, wherein:
radiating energy includes radiating electromagnetic energy from at least one electrical antenna coupled to the drill collar, and
receiving electromagnetic energy with at least one array of electrical antennae coupled to the drill bit.

22. The method of claim 21, further comprising measuring at least one resistivity value for a formation proximate the well.

23. The method of claim 22, further comprising approximating a formation resistivity value by comparing resistivity values measured at different depths of investigation into the formation.

24. A method for logging a well, including:
radiating energy from at least one element coupled to a drill bit, and
receiving energy with at least one array of elements coupled to a drill collar,
wherein the drill collar is coupled to the drill bit; and
scanning regions of a formation proximate the well with at least one directional beam; and wherein the at least one array of elements functions as an electronic array; and the electronic array is configured to form at the least one directional beam.

25. The method of claim 24, wherein:
radiating energy includes radiating electromagnetic energy from at least one electrical antenna coupled to the drill bit, and
receiving electromagnetic energy with at least one array of electrical antennae coupled to the drill collar.

26. The method of claim 25, further comprising measuring at least one resistivity value for a formation proximate the well.

27. The method of claim 26, further comprising approximating a formation resistivity value by comparing resistivity values measured at different depths of investigation into the formation.

28. An apparatus for logging a well, including:
a drill bit,
at least one array of elements coupled to the drill bit, wherein the at least one array of elements functions as an electronic array; and
a processor configured to execute executable instructions that are stored in a memory;
wherein the executable instructions cause the processor to;
focus the at least one array of elements to form at least one directional beam; and
cause the at least one array of elements to scan a region of a formation proximate the well with the at least one directional beam.

29. The apparatus of claim 28, wherein at least one element of the at least one array of elements is an acoustic sensor.

30. The apparatus of claim 28, wherein at least one element of the at least one array of elements is an electrical antenna.

31. The apparatus of claim 28, wherein at least one element of the at least one array of elements is an electrode.

32. The apparatus of claim 28, wherein the at least one array of elements is adapted to receive energy.

33. The apparatus of claim 28, wherein at least one element of the at least one array of elements is adapted to radiate energy.

34. The apparatus of claim 28, further including a processor including executable instructions that cause the processor to enhance data representing energy received with the at least one array of elements.

35. The apparatus of claim 28, further including a telemetry system coupled to the at least one array of elements to transmit data representing energy received with the at least one array of elements.

36. The apparatus of claim 28, wherein the processor includes a computational unit adapted to activate the elements with at least one beam-forming shift, wherein the at least one beam-forming shift is a frequency shift, phase shift, amplitude shift or time delay.

37. The apparatus of claim 28, further including a processor including executable instructions causing the processor to control time and phase characteristics associated with receiving energy with the at least one array of elements relative to time and phase characteristics associated with radiating energy from the at least one array of elements to create at least one synthetic array.

38. The apparatus of claim 28, wherein the drill bit has at least one arm, and wherein the at least one array of elements is located on at least one arm of the drill bit.

39. The apparatus of claim 28, wherein the drill bit has at least one groove, and wherein the at least one array of elements is located in at least one groove.

40. The apparatus of claim 28, wherein the at least one array of elements assumes at least one spiral configuration.

41. The apparatus of claim 28, wherein the at least one array of elements is formed from at least one bender bar.

42. The apparatus of claim 28, further including a processor including executable instructions that cause the processor to analyze data representing energy received with the at least one array of elements.

43. An apparatus for logging a well, including:
a drill bit having at least one electrical antenna coupled thereto,
a drill collar coupled to the drill bit,
at least one array of electrical antennae coupled to the drill collar, wherein the at least one array of electrical antennae functions as an electronic array; and
a processor configured to execute executable instructions that are stored in a memory;
wherein the executable instructions cause the processor to:
focus the at least one array of elements to form at least one directional beam; and
cause the at least one array of elements to scan a region of a formation proximate the well with the at least one directional beam.

44. The apparatus of claim 43, wherein the executable instructions further cause the processor to analyze data representing electromagnetic energy received with the at least one array of electrical antennae.

45. The apparatus of claim 44, wherein the processor includes a computational unit adapted to measure at least one resistivity value for a formation proximate the well.

46. An apparatus for logging a well, including:
a drill collar having at least one electrical antenna coupled thereto,
a drill bit coupled to the drill collar,
at least one array of electrical antennae coupled to the drill bit, wherein the at least one array of electrical antennae functions as an electronic array; and
a processor configured to execute executable instructions that are stored in a memory;
wherein executable instructions cause the processor to:
focus the at least one array of elements to form at least one directional beam; and
cause the at least one array of elements to scan a region of a formation proximate the well with the at least one directional beam.

47. The apparatus of claim 46, wherein the executable instructions further cause the processor to analyze data representing electromagnetic energy received with the at least one array of electrical antennae.

48. The apparatus of claim 47, wherein the processor includes a computational unit adapted to measure at least one resistivity value for a formation proximate the well.

49. An apparatus for logging a well, including:
a drilling rig,
a drill string coupled to the drilling rig,
a drill bit coupled to the drill string,
at least one array of elements coupled to the drill bit, wherein the array of elements functions as an electronic array,
a data storage unit coupled to the at least one array of elements,
a battery coupled to the data storage unit,
a transmission system coupled to the data storage unit,
a processor coupled to the data storage unit; and
wherein the processor is configured to execute executable instructions that are stored in a memory;
wherein executable instructions cause the processor to:
focus the at least one array of elements to form at least one directional beam; and
cause the at least one array of elements to scan a region of a formation proximate the well with the at least one directional beam.

* * * * *